US008496797B2

(12) United States Patent
Barber

(10) Patent No.: US 8,496,797 B2
(45) Date of Patent: Jul. 30, 2013

(54) ELECTRICAL DEIONIZATION APPARATUS

(75) Inventor: John H. Barber, Fergus (CA)

(73) Assignee: General Electric Company, Schenectady, NY (US)

(*) Notice: Subject to any disclaimer, the term of this patent is extended or adjusted under 35 U.S.C. 154(b) by 284 days.

(21) Appl. No.: 12/967,628

(22) Filed: Dec. 14, 2010

(65) Prior Publication Data

US 2012/0145547 A1 Jun. 14, 2012

(51) Int. Cl.
B01D 61/48 (2006.01)

(52) U.S. Cl.
USPC .............. 204/524; 204/551; 204/647

(58) Field of Classification Search
USPC ............. 205/524, 551, 647; 204/524, 551, 204/647
See application file for complete search history.

(56) References Cited

U.S. PATENT DOCUMENTS

| 4,632,745 | A | 12/1986 | Giuffrida et al. |
| 4,851,100 | A | 7/1989 | Hodgdon et al. |
| 5,026,465 | A | 6/1991 | Katz et al. |
| 6,197,174 | B1 | 3/2001 | Barber et al. |
| 6,514,398 | B2 | 2/2003 | DiMascio et al. |
| 7,306,709 | B2 | 12/2007 | Grebenyuk et al. |
| 7,344,629 | B2 | 3/2008 | Holmes et al. |
| 7,794,577 | B2 | 9/2010 | Carson et al. |
| 2006/0169586 | A1 | 8/2006 | Zhang et al. |
| 2006/0266651 | A1 | 11/2006 | Iwasaki |
| 2010/0096269 | A1 | 4/2010 | Kaku et al. |
| 2010/0126867 | A1* | 5/2010 | Riviello ............ 204/632 |
| 2011/0042214 | A1* | 2/2011 | Rath et al. ......... 204/537 |

FOREIGN PATENT DOCUMENTS

| GB | 702316 A | 1/1954 |
| WO | 2005009596 A1 | 2/2005 |
| WO | 2006062176 A1 | 6/2006 |
| WO | WO2006112974 | 10/2006 |
| WO | 2008130579 A1 | 10/2008 |
| WO | 2009051612 A1 | 4/2009 |

OTHER PUBLICATIONS

Search Report and Written Opinion from corresponding PCT Application No. PCT/US2011/057968 dated Feb. 23, 2012.

* cited by examiner

Primary Examiner — Arun S Phasge
(74) Attorney, Agent, or Firm — Wegman, Hessler & Vanderburg

(57) ABSTRACT

Electrodeionization methods and apparatus wherein ion exchange membranes are not utilized. Instead, ion exchange materials such as beads, fibers, etc., are disposed in alternating layers of anion exchange (AIX) materials and cation exchange (CIX) materials between opposite polarity electrodes. In a regeneration stage, a current is applied across the electrodes with water splitting occurring along at least one of the interfacial areas between neighboring AIX and CIX materials. The $H^+$ and $OH^-$ ions formed via water splitting migrate in response to the electrical current and displace the salt ions in the respective AIX and CIX. The stack is flushed during the regeneration stage to remove the concentrated salt solution. During a deionization phase, the electrical current is terminated with influent fed to the stack for deionization. The salt ions in the influent are depleted via ion exchange as the influent contacts the AIX and CIX.

9 Claims, 2 Drawing Sheets

ELECTRICAL DEIONIZATION APPARATUS

FIELD OF INVENTION

The invention pertains to membraneless methods and apparatus adapted to perform electrodeionization functions including deionization of influent and regeneration of active ion exchange sites on associated ion exchange materials.

BACKGROUND OF THE INVENTION

Electrodeionization (EDI) is a process that removes ionized and ionizable species from liquids using electrically active media and an electrical potential to influence ion transport. In many EDI processes, ion conducting membranes and an imposed electrical current are used. Cations and anions in the feedwater are exchanged for hydrogen and hydroxyl ions in the ion exchange resin or membrane, thus producing demineralized feedwater.

Hydrogen and hydroxyl ions are needed to regenerate the exchange sites, and these are continuously regenerated in EDI processes by the electrically driven water splitting process by which $H^+$ and $OH^-$ ions are generated. The ion conducting membranes utilized in the process are semipermeable anion and cation ion exchange membranes and are provided in stacks between electrodes with spaces between membranes configured to create fluid flow compartments. The anion membranes allow only negatively charged ions (anions) to permeate while the cation membranes allow only the positively charged ions (cations) to permeate. Ions migrating through the stack toward their opposite polarity electrodes are trapped in certain "concentrating" compartments while the influent feed is purified in so-called dilution compartments from which the salt imparting ions have vacated. The reduced ion purified product is taken from these dilution compartments to a header or the like for collection.

These EDI devices depend on the use of expensive ion exchange membranes or carbon electrodes. There is accordingly, a need in the art for a device that can perform intended deionization function that uses less expensive materials such as ion exchange beads.

SUMMARY OF THE INVENTION

In one embodiment, the invention pertains to an electrodechemical deionization device and method which includes two operational steps. The first step or phase involves regeneration of the active sites on the ion exchange resin. In this phase, a flushing liquid is fed as influent with a current passing through the device. In the second or deionization phase, the current is turned off or reversed, and the regenerated ion exchange resin deionizes the water as it passes through the device. These two steps alternate in time, cycling between the regeneration then deionization steps.

In accordance with one aspect of the invention, a method is provided for reducing ion concentration in an influent solution. As part of the method, and in a deionization phase thereof, the influent is fed to a membraneless electrodeionization (EDI) stack. The stack comprises an array of alternating layers of porous anion exchange materials (AIX) and cation exchange materials (CIX). In one embodiment, the AIX and CIX materials are disposed in a sandwich like structure with at least one interfacial area existing between contiguous AIX and CIX layers. The influent is passed over the AIX and CIX array, whereby the ionic concentration of the influent is reduced via ion exchange with the active sites of the AIX and CIX materials. The deionized product is collected from the EDI stack.

In a regeneration phase of the process, a voltage is imparted across the electrodes and a flushing solution is provided as influent across the membraneless sandwich array of the EDI stack traversing the AIX and CIX materials. Water splitting occurs along at least one of the interfacial areas resulting in the formation of hydrogen $H^+$ and $OH^-$ ions which migrate to and replenish the AIX and CIX materials. A waste stream is recovered as effluent from the stack as a result of this regeneration phase.

In accordance with another aspect of the invention, the influent to be purified is water having dissolved sodium and chloride ions therein. In certain exemplary embodiments, the CIX materials comprise beads having fixed $SO_3^{2-}$ ions therein, and in other embodiments, the AIX materials comprise beads having fixed quaternary ammonium ions therein.

In other embodiments, the EDI stack further comprises at least one mixed ion exchange material interposed between AIX and CIX material layers.

From an apparatus perspective, the EDI apparatus comprises a membraneless stack of alternating layers of AIX and CIX materials interposed between an opposing cathode and anode. The stack of alternating layers defines at least one interfacial area between an AIX and CIX. The EDI stack, in accordance with the invention, is devoid of any ion exchange membranes therein save for membranes that may border the electrodes.

DETAILED DESCRIPTION OF EXEMPLARY EMBODIMENTS

Figure 1:
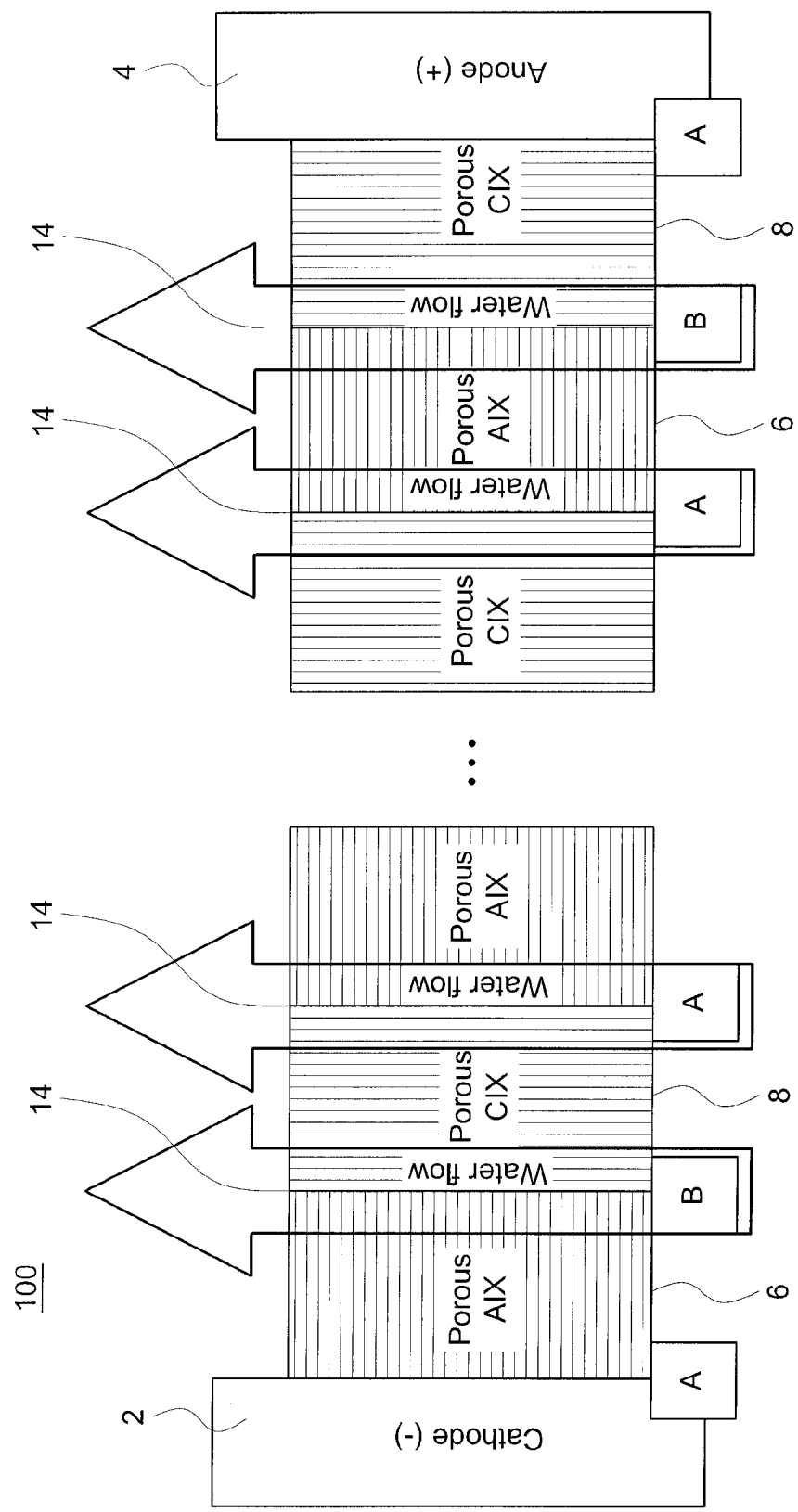
FIG. 1 is a schematic diagram of one membraneless EDI stack in accordance with the invention.

Turning first to FIG. 1, there is shown a first exemplary embodiment of the invention comprising a membraneless electrodeionization (EDI) stack configuration. As shown, the EDI stack 100 comprises opposing cathode 2 and electrode 4 with the space between the electrodes composed entirely of alternating contiguous layers of porous anion ion exchange materials 6, and porous cation ion exchange materials 8. As shown, a plurality of interfacial AIX and CIX areas 14 are formed by this alternating, sandwich structure.

The electrodes 2, 4 may be composed of conventional materials such as corrosion resistant metals such as titanium, niobium, stainless, etc., and in some instances, these materials may be provided with an outer coating of a noble metal such as platinum. In the embodiment shown, cathode 2 is composed of stainless with anode 4 composed of Ti coated with $IrO_2$.

The alternating contiguous layers of the stack construction span the entirety of the distance between the electrodes and define a sandwich like array. As to the ion exchange materials 6, 8, these can be in any form other than membrane form. Ion exchange beads are preferred, although the artisan will appreciate that these materials may also be present in fiber, granule, or other ion absorptive form, save for membrane form.

Exemplary anion ion exchange resins (AIX) include the strongly basic type based on inclusion of quaternary amino groups such as trimethylammonium groups including trimethylbenzyl ammonium and the weakly basic groups based on primary, secondary, and/or tertiary amines such as polyethylene amine These anion exchange resins are sold commercially. As is known in the art, these materials provide for ion exchange of counter ions such as $Cl^-$ on the fixed ion portion of the structure.

Exemplary cation ion exchange (CIX) materials may include those based on sulfonic acid groups such as sodium polystyrene sulfonate or polyAMPS (acrylamidopropanesulfonate) or the weakly acidic groups such as the carboxylic acid groups. These cation exchange resins are all well known and commercially available. As is known in the art, these materials provide for ion exchange of counterions such as $Na^+$ on the fixed ion portion of the structure.

Figure 2:
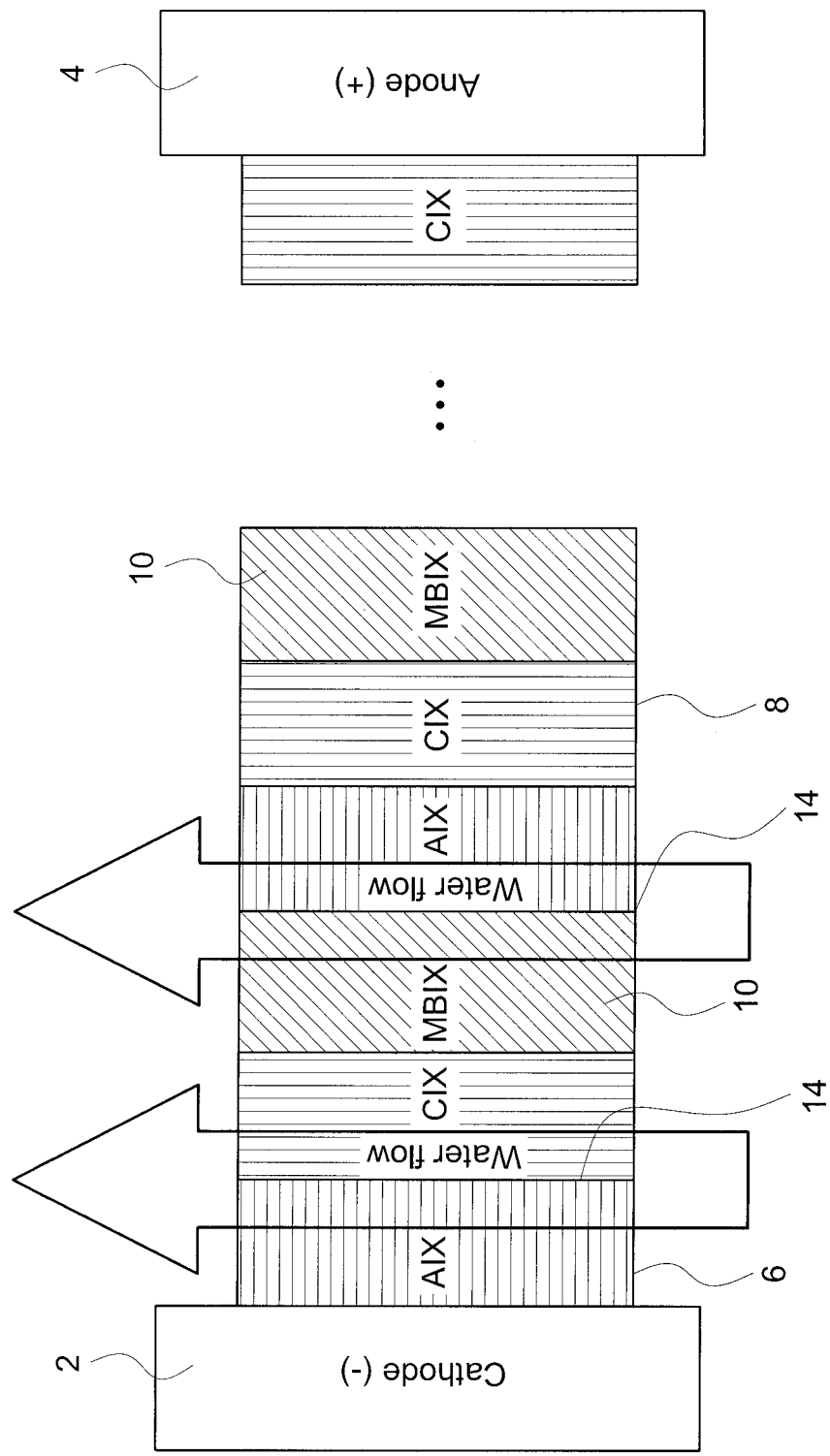
FIG. 2 is a schematic diagram of another membraneless EDI stack in accordance with the invention.

FIG. 2 shows another embodiment wherein a mixed bed ion exchange (MBIX) layer 10 is included interposed between layers of anion ion exchange material 6 and cation exchange material 8. The inclusion of the mixed bed serves to increase the contact surface area between the two types of ion exchange material to facilitate appropriate decrease in the voltage that need be applied across the electrodes during the regeneration phase as shall be referred to later. The MBIX layer preferably comprises a mix of AIX and CIX materials in an AIX:CIX ratio of about 0.177-5.67:1.

In operation, and with reference to FIG. 1, there is described a charging phase of operation in which, for example, an influent stream is fed to the bottom of the stack in the direction as shown by the arrows. It is important to note here that the influent stream is fed across the entire surface of the sandwich array of alternating anion ion exchange and cation exchange materials from the bottom through to the top, exiting as an effluent waste stream. During this charging or regeneration phase, a direct current, for example, 5 amperes, flows through the assembly from cathode to anode, and the influent stream may be fed for instance at about 100 liters/hour. The influent feed, or flush feed as referred to during this charging or regeneration phase, may have for example, a conductivity of 2 µS/cm. The electric field causes water to split into component ions $H^+$ and $OH^-$ that migrate through the ion exchange materials toward the electrode having opposite polarity. That is, the $H^+$ ion migrates toward the cathode with the negatively charged $OH^-$ migrating toward the anode. This water splitting occurs at the AIX/CIX interfacial areas noted as "A" in FIG. 1. The $H^+$ and $OH^-$ ions migrate into their respective IX resins, displacing salt ions and, in effect, regenerating the IX materials. Salt ions held in the IX resins will also migrate in this electrical field 1, eventually reaching a second AIX/CIX interface at which point they release into solution. This concentrated solution is removed as effluent or waste from the top part of the stack in relation to FIG. 1 so as not to contaminate the newly generated IX resin, and this effluent may, as expected, be highly conductive on the order of for example 800 µS/cm. Influent or flush feed may be maintained for a time to result in a waste stream effluent ultimately exhibiting a diminished or steady state conductivity. Once the IX resin has been partially or completely regenerated, the power to the stack can be discontinued so that the stack can be operated then in its deionization phase.

During the deionization phase, influent such as salt water to be deionized is fed across the array of IX materials as shown by the arrows in FIG. 1. The cations and anions in the influent feed impinge upon the IX beads or the like, are adsorbed into the IX materials, and the IX materials release $H^+$ and $OH^-$ which recombine to form water into the influent steam as it travels (upwardly with respect to FIG. 1) through the stack. Purified product is removed from the top of the stack.

As an example, during the deionization phase of operation, the feed may be a slightly salt water such as measured as 25 µS/cm. (Similar to reverse osmosis product water). The influent may be fed at for example, 1100 liters/hour. As above stated, in one embodiment during the normal deionization phase, no voltage is applied across the electrodes. The regenerated bed of IX beads or the like removes salt imparting ions through conventional IX processes. The deionization would occur until the IX beds are exhausted. It is noted that waters having up to about 1000 µS/cm can be deionized in accordance with the invention.

The artisan will readily appreciate that a conductivity sensor may be used to, for example, measure the conductivity of effluent during one or both of the regeneration or deionization cycles. For example, the sensor could be operatively associated with a controller to initiate or terminate the application of the electrical feed across the electrodes, or regulate the influent feed type, i.e., regeneration flush or water to be purified during the deionization process. For example, during the regeneration phase, effluent conductivity can be measured, and when this measurement would be less than a preselected value, regeneration would terminate followed by feed of influent water for purification during the deionization phase. Additionally, during the deionization phase, product conductivity could be measured, and when this measurement exceeded a preselected value, influent feed could be changed to regeneration flush feed with commensurate application of an electrical potential across the electrodes.

Also, it is to be noted that, in contrast to the flow direction shown in FIG. 1, if porous electrodes are used, the fluid flow could be made through the electrodes perpendicular to the fluid flow direction shown in FIG. 1. Additionally, it may be beneficial to provide opposite flow directions for the renegeration phase and deionization phase.

FIG. 2 shows another embodiment in which a mixed bed of ion exchange materials 10 such as beads, fibers, etc., are interposed between layers of the cation ion exchange materials. The principles of operation of this embodiment are substantially the same as set forth above in connection with FIG. 1. During the regeneration cycle, water splitting occurs along some of the interfacial areas 14 with the salt imparting ions trapped and concentrated at other ones of the interfacial areas 14.

As indicated briefly above, during the deionization phase, it may be possible to enhance the demineralization process by applying an electrical field in a polarity that is opposite from the regeneration polarity. It is thought that the current or voltage for this would be some fraction of that required for the regeneration phase.

The artisan may appreciate that a membrane such as an ion exchange, water permeable membrane such as a thin UF membrane or the like, or a very tight mesh membrane, may be placed adjacent to but spaced apart from one or both of the electrodes in order to prevent gasses from entering the bulk of the stack during regeneration. For example, and with reference to FIG. 1, a membrane could be provided between the AIX material 6 next to cathode 2 and the cathode. Also, a membrane could be located between the CIX layer adjacent anode 4 and the anode. The phrase "membraneless deionization" or reference to the fact that the stack is devoid of ion exchange membranes therein or equivalent verbiage shall not preclude such constructions as envisioned above wherein a membrane may border one or both of the electrodes. These phrases do however signify that the array of AIX, CIX, and MBIX materials does not include a membrane located at any of the interfacial surfaces between the adjacent AIX, CIX, or MBIX members of the array.

It will be apparent to those skilled in the art that other changes and modifications may be made in the above methods and apparatus without departing from the scope of the invention herein, and it is intended that all matter contained in the above description shall be interpreted in an illustrative and not a limiting sense.

While the invention has been described in terms of preferred embodiments, claims appended hereto are intended to encompass all other embodiments which fall within the spirit of the invention.

The invention claimed is:

1. Method of reducing ion concentration in an influent solution comprising:
   in a deionization phase of operation, feeding said influent to a membraneless electrodeionization (EDI) stack comprising layers of porous anion exchange materials (AIX) and cation exchange materials (CIX) interposed between a cathode and an anode, a plurality of said layers being positioned in alternating AIX and CIX layer pairs defining an interfacial area between each said AIX and CIX layer in each pair, passing said influent over said AIX and CIX whereby said ion concentration is reduced via ion exchange with said AIX and CIX;
   collecting deionized product from said EDI stack; and
   in a regeneration phase of operation, imparting a voltage across said electrodes and feeding flush water as influent to said EDI stack and across said AIX and CIX materials, whereby water splitting occurs along at least one of said interfacial areas resulting in formation of $H^+$ and $OH^-$ ions which migrate to and regenerate said AIX and CIX materials, and recovering a waste stream as effluent, said deionization phase and said regeneration phase alternating in time.

2. Method as recited in claim 1 wherein said influent is water with dissolved $Na^+$ and $Cl^-$ ions therein.

3. Method as recited in claim 2 wherein said CIX materials comprise beads having fixed $SO_3^{-2}$ ions therein.

4. Method as recited in claim 2 wherein said AIX materials comprise beads having fixed quaternary ammonium ions therein.

5. Method as recited in claim 1 wherein said EDI stack further comprises at least one mixed ion exchange material therein disposed in said stack.

6. Electrodeionization apparatus for reducing ion concentration from an influent stream, said apparatus comprising layers of anion exchange materials AIX and cationic exchange materials CIX interposed between a cathode and an anode, a plurality of said layers being positioned in contiguous, alternating AIX and CIX layer pairs defining an interfacial area between each said AIX and CIX layer in each pair, said stack of alternating layers defining at least one interfacial area between an AIX and a CIX, said stack being devoid of ion exchange membranes, said apparatus configured for selective alternate operation between a deionization phase of operation in which said ion concentration is reduced via ion exchange with said AIX and CIX layers and a regeneration phase of operation in which water spitting occurs along at least one of said interfacial areas resulting in formation of $H^+$ and $OH^-$ ions which migrate to and regenerating said AIX and CIX layers.

7. Apparatus as recited in claim 6 wherein said CIX comprises beads having fixed $SO_3^-$ ions therein.

8. Apparatus as recited in claim 6 wherein said AIX comprises beads having fixed quaternary ammonium ions therein.

9. Apparatus as recited in claim 6 further comprising at least one mixed ion exchange material in said stack and interposed between an AIX and CIX.

* * * * *